May 15, 1945.　　　C. R. SACCHINI　　　2,376,012
DRIVING ARM MECHANISM
Filed Oct. 29, 1942
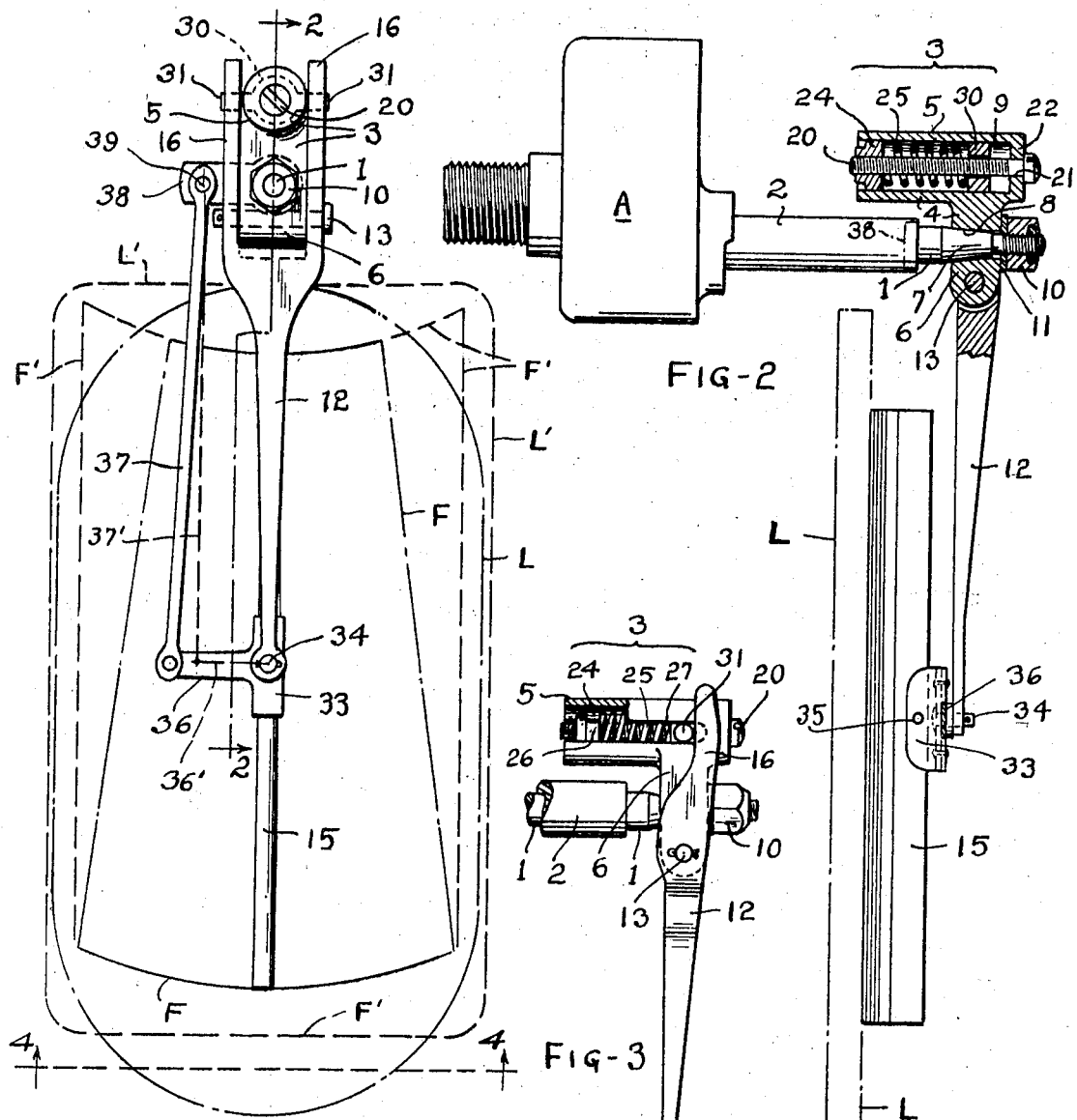
INVENTOR
COLUMBUS R. SACCHINI
BY
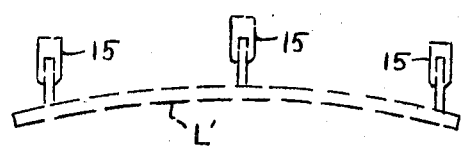
ATTORNEY Patented May 15, 1945

2,376,012

UNITED STATES PATENT OFFICE 2,376,012

DRIVING ARM MECHANISM

Columbus R. Sacchini, Euclid, Ohio, assignor to The Marquette Metal Products Company, Cleveland, Ohio, a corporation of Ohio Application October 29, 1942, Serial No. 463,746

4 Claims. (Cl. 15—255)

This invention relates to a novel driving arm and shaft assembly for connecting a mechanism such as represented, for example, by power driven wiper units for windshields, sight glasses etc. on aircraft and other vehicles, to an element to be driven—in such case, a wiper blade. The above indicates the general object hereof.

The objects include provision of: an improved wiper arm mounting which will enable a wiper-blade-driving arm to be adjusted for different contact pressures of the blade with respect to the surface which is to be kept clear and will enable the wiper to make proper contact with surfaces of different character i. e., planar and curved, and a mounting which will enable the working field of the wiper to be adjusted by infinitely small increments (as for centralizing the operating zone of the wiper relative to side limits of a glass to be kept clear).

A specific object is to provide a compact and simple wiper drive arm mounting and cooperating wiper control mechanism, which, together, are capable of enabling a wiper blade driven by the arm to maintain substantially uniform contact pressures on surfaces of simple curved form, (for example, cylindrically or conically convex), although the drive arm is limited to swing about a fixed axis as of a drive shaft in fixed operating position.

A further specific object is to provide a cartridge type mounting head for a wiper driving arm, which head is capable of adjustments to effect different working pressures on part of a wiper blade actuated through the intermediary of the head.

Other objects and novel features of the invention will be explained or made apparent in the following description of a preferred form, shown in the accompanying drawing, wherein:

Fig. 1 is a front assembly view of the mounting, wiper arm and blade; Fig. 2 is a side elevation of the same as connected to a driving unit, the view being partly in central section as indicated by the line 2—2 on Fig. 1; Fig. 3 is a detail, partial assembly, side elevation similar to Fig. 2—also partly broken away in central section; and Fig. 4 is a diagrammatic edgewise view of a curved window, as though viewed along the line 4—4 on Fig. 1, showing a wiper blade in two extreme positions and one intermediate position.

Figs. 1 and 2 show diagrammatically, in dot-and-dash outline L a window panel to be kept clear by the wiper mechanism illustrated, and Fig. 1 shows (dot-and-dash line F) the portion of one face of the window over which the wiper blade B can be made to operate with the window unit or wiper driving mechanism A (Fig. 2) mounted in the position in which shown. The window unit A can be mounted either on the inside or outside of the supporting wall (not shown) for the window panel, as on a suitable bracket carried by such wall, and with the wiper arm drive shaft 1 of the unit projecting at right angles to the principal plane of the window panel. Thus the blade of a wiper arm and blade assembly carried on a free end portion of the shaft would ordinarily be oscillated in a plane parallel to the outer face of the window. With a window of small size, as of a gun sight aperture, it is desirable to maintain clear a fairly large portion of the surface, yet at the same time, in order to minimize outward projections, be able to mount the unit so that the drive shaft is fairly close to one edge of the window. The position of the window on the supporting structure may be such as to require greater applied wiping force in some instances than in others and, moreover, the window may be flat or have more or less transverse curvature—see L', Fig. 4; and it is, of course, desirable to meet as many of the various conditions as possible in a single design of wiper arm driving unit mechanism. The present solution is capable of effective use where the conditions vary as suggested above.

The window unit A may comprise a housing having suitable driven mechanism therein for oscillating the shaft 1 through the desired angle and a support for the shaft such as the tubular bearing member 2 from which the shaft projects. The arm driving head 3 (cartridge assembly) has an L-shaped body 4 with a hollow barrel portion 5 at one side of the shaft (above, in position shown) and an arm portion 6 rigid with the barrel and extending beyond the shaft axis to the opposite side of the shaft (lower side as shown).

For angular adjustment of the head about the axis of the shaft 1, the shaft has a frusto-conical portion 7 and the arm 6 a complementary bore 8 generally parallel to the axis of a bore 9 of the barrel portion. The arm 6 may thus be wedged onto, and thereby, in effect, locked to the shaft in an unlimited number of angularly adjusted positions about the shaft axis. As shown, a nut 10 (e. g. elastic stop nut) is secured to a reduced and threaded outer end portion of the shaft, and bears, for example through the intermediary of a washer 11, on the outer face of the arm 6 of the head.

The wiper drive arm further comprises a lever section 12 constituting the blade supporting section and which extends generally in the plane of oscillation of the head 3 (arm 6 thereof). The section 12 is pivoted to the arm 6 below the shaft axis as by a detachable pin 13 extending transverse to said axis (horizontally in the position in which the mechanism generally is illustrated). The lever section 12, at its free (e. g. lower) end, carries the wiper blade 15 (as will be more fully described later) for movement over the window panel; and the opposite (e. g. upper) end of the lever is forked to provide parallel arms 16 through which the pivot pin 13 extends and which may be swung about the pivot in positions close to opposite sides of the barrel portion 5 of the head (Fig. 1). Thus the blade supporting portion of the wiper drive arm is independent of the plane of movement of the head section, subject to adjustment in respect to any window surface and capable of efficient operation over window surfaces of simple curved form as well as planar surfaces.

The bore 9 of the barrel 5 of the head contains a central screw 20 supported in part in a hole 21 in an outer end wall 22 of the barrel, which screw has a threaded shank inside the barrel and a head adjacent and abutting the wall 22 outside of the barrel in readily accessible position for adjustment by a suitable tool. The screw has threaded relationship only with a reactance block (nut) 24 of a coiled compression spring 25, said block being freely slidable in the bore 9 of the barrel but prevented from turning as by lugs 26 (one shown, Fig. 3) projecting respectively into paired slots 27 formed in diametrically opposite sides of the barrel wall. The slots 27 extend from points near the closed end of the barrel to the open end thereof (left Fig. 2) where the slots are open.

Turning of the screw 20 shifts the block 24 to various positions along the barrel, (compare Figs. 2 and 3). The block, in turn, through the spring 25 and a follower or crosshead 30, slidable in the barrel and against which the adjacent end of the spring normally bears, determines the effective pressure of the wiper blade on the window panel, said crosshead having lugs or pins 31 projecting through the slots 27 for operating (follow up) abutment with the fork arms 16 of the lever 12. The fork arms 16 could have outwardly open vertical slots to receive the lugs 31 of the crosshead in order more positively to determine the position of the wiper blade and prevent slack; but that is unnecessary because there is always some pressure maintained by the wiper blade on the window face, and slack or looseness is prevented thereby.

The construction described above enables fine adjustment of blade pressure in a very simple way (as by a screw driver) and enables the blade to remain in uniform pressure contact with a glass having simple curvature (see Fig. 4); the coil spring acts on the threaded reactance block or perch 24 of the spring (since neither block nor crosshead 30 can turn) as a very effective means for locking and preventing the adjustment from being disturbed by vibrations of the supporting structure or driving unit; and, whenever desired, the spring force may easily be adjusted either by turning of the screw in the proper direction or by substitution of a different (e. g. stiffer) spring for the one originally provided.

In Figs. 1 and 2 there is shown a pantograph mechanism arranged for enabling the wiper blade to wipe an area such for example as that enclosed by the dot-and-dash line F which area is somewhat similar to the shape of the glass (dot-and-dash outline L) than would be the case were the wiper blade 15 constrained to move parallel with the lever or blade drive arm section 12 about the axis of the drive shaft. The arm 12 is connected to the saddle 33 of the blade by a pivot pin 34 extending normal to the glass, and the saddle, in turn, is pivotally connected at 35 with a relatively rigid back or frame piece of the blade. The saddle has an arm 36 extending laterally from the principal plane of the blade, and the outer end of the arm 36 is pivotally connected to a link 37 at one side of the arm 12. The end of the link lying remotely of the arm 36 is pivotally connected at 39 to a fixed bracket 38 near the drive shaft but at one side of it. When the arm 12 swings the blade to and fro over the glass, the linkage 36, 37 causes the blade to move as though it were fastened to a drive arm having nearly twice the effective length of the drive arm illustrated and pivoted much more remotely of the glass than is actually the case. In other words, the side limits of the sweep of the blade diverge at a less angle than they would without the linkage.

By arranging the pantograph linkage with an arm the length of the broken line 36', Fig. 1, (same length of arm as the distance of the pivot 39 from the center of the drive shaft 1) and with the axis of the link 37 extending along the broken line 37', the blade is caused to remain parallel to the opposite edges of a glass of generally rectangular form, such, for example, as indicated in broken lines at L' so that the field F' cleared by the blade is still more nearly similar to the total effective window area; and—if the surface of such glass is a simple curve, (cf. Fig. 4 at L')—then the pantograph mechanism and the variable adjusting means (cartridge assembly) further cooperate to the extent of enabling the wiper blade to remain in proper wiping relationship to the glass for the full length of the blade because the blade remains parallel to the ordinates of the curved surface. Such operation is demonstrated, in part, by the two extreme positions and one intermediate position of the blade 15 in Fig. 4 and, in part, by the broken lines F' and L' on Fig. 1. In case the curved surface is conically convex then the pantograph mechanism, if used, would be modified as to pantograph arm length relationships in accordance with the angle of convergence of the basic surface, as will be readily apparent in view of the above description.

I claim:

1. A wiper blade drive arm assembly comprising a head section adapted for connection with a drive shaft, a barrel and spring therein in fixed position on the head and with the barrel axis generally parallel to the shaft but offset therefrom at one side in the mounted position of the head, a wiper blade section pivoted to the head on an axis offset from the shaft axis and on the opposite side from the barrel axis, said blade section having a portion extending away from the pivot and lying substantially in the transverse plane of the head and operatively connected to the spring for applying working pressure to a blade carried by the blade section, and means for adjusting the working force of the spring.

2. A wiper blade drive arm assembly comprising a head section adapted for connection to a driving mechanism, a blade drive arm section pivoted to the head section, a spring barrel in fixed position on the head section and extending at right angles to the pivot axis and spaced therefrom in the direction of extent of said sections, a coil spring in the barrel and movable lengthwise thereof, one end of the spring being operatively connected to the blade drive arm section for applying pressure to a blade carried by that section, and an adjusting screw carried by the barrel and operatively connected to the opposite end of the spring by a threaded nut engaging threads of the screw, and means guiding the nut for movement along the barrel while preventing rotation of the nut in the barrel.

3. A window wiper drive arm assembly, comprising a head section having a bore to receive a drive shaft, a spring housing with a guideway generally parallel to said bore, a nut slidable but non-rotatable in the guideway, a compression spring in the housing bearing on the nut at one end, a crosshead slidable in the guideway against which the other end of the spring normally bears, an adjusting screw turnably mounted in the housing and threaded to the nut, a blade drive arm section pivoted to the head section on an axis perpendicular to the bore, and an arm member on the blade drive arm section extending away from said axis and operatively connected to the crosshead.

4. Mechanism according to claim 3 wherein the housing has parallel slots on opposite sides, the nut has means engaging one of the slots to keep the nut from turning, the crosshead has pins projecting through respective slots for operating contact with the arm member of the blade section, which latter constitutes a fork.

COLUMBUS R. SACCHINI.